United States Patent [19]

Matsuyama et al.

[11] Patent Number: 4,527,033
[45] Date of Patent: Jul. 2, 1985

[54] STEEL PIPE WELDING METHOD

[75] Inventors: Junya Matsuyama, Yotsukaido; Akio Kamada, Chiba; Fumimaru Kawabata, Chiba; Tatsufumi Uegaki, Chiba; Shigeru Miyake, Chiba, all of Japan

[73] Assignee: Kawasaki Steel Corporation, Kobe, Japan

[21] Appl. No.: 496,840

[22] Filed: May 23, 1983

[30] Foreign Application Priority Data

May 21, 1982 [JP] Japan .................................. 57-86110

[51] Int. Cl.³ ................................................ B23K 9/02
[52] U.S. Cl. ................................... 219/61; 219/60 R; 219/61.7
[58] Field of Search .................... 219/59.1, 60 R, 60.2, 219/61, 61.6, 61.7, 158

[56]            References Cited
U.S. PATENT DOCUMENTS

| 1,622,251 | 3/1927 | Nelson | 219/60 R |
| 4,152,568 | 5/1979 | Yamaguchi et al. | 219/59.1 X |
| 4,341,938 | 7/1982 | Matsubara et al. | 219/61 |

FOREIGN PATENT DOCUMENTS

| 2708364 | 8/1978 | Fed. Rep. of Germany | 219/59.1 |
| 1496377 | 12/1977 | United Kingdom . | |

OTHER PUBLICATIONS

*Metals Handbook*, 8th Ed., vol. 6, Metals Park, Ohio: American Society for Metals, (1974), pp. 46–47.

Primary Examiner—Philip H. Leung
Assistant Examiner—Catherine M. Sigda
Attorney, Agent, or Firm—Balogh, Osann, Kramer, Dvorak, Genova & Traub

[57] ABSTRACT

An improved welding method for welding an inner seam of a longitudinally welded steel pipe along an inner groove by welding electrodes held by a boom which is supported by a tracing roller moving along the inner groove of the steel pipe. According to the invention, at least one metal plate is urged against at least one end of the steel pipe after tack welding the seam on an opposite side of the inner groove of the steel pipe to be welded. Lateral angular deformations of the end of the steel pipe are prevented on both sides of the seam. Such deformations are due to the load of the boom when the tracing roller leaves the end of the steel pipe for the metal plate. Thus, the invention provides for prevention of hot cracking at the end of the pipe. Moreover, according to the invention, portions of the steel pipe on both sides of the distal end of the weld bead, at the end of the pipe, are heated to cause expansion displacements of the heated portions directing toward the center of the weld bead, or high temperature portions of the steel pipe, after a heat source for the seam welding has passed therethrough, are cooled, thereby reducing tearing forces acting upon the weld bead so as to prevent more effectively the hot cracking at the end of the pipe.

17 Claims, 12 Drawing Figures

STEEL PIPE WELDING METHOD

BACKGROUND OF THE INVENTION

1. Field of the Invention

This invention relates to a longitudinal welding method of a steel pipe, and more particularly to a welding method capable of preventing cracks (pipe end cracks) in bead ends at ends of large diameter straight seam welded steel pipes in an inner surface welding process.

2. Description of the Prior Art

A typical steel pipe longitudinally welded in the pipe manufactured by the processes that are U-ing-pressing (forming the material into U-shape in cross-section), O-ring-pressing (forming the material into O-shape in cross-section) and Expanding. The inner seam welding of a longitudinally welded steel pipe is generally effected by the submerged arc welding (SAW) or the inert gas shielded metal arc welding (MIGW). In this case, welding electrodes are supported by a boom which is guided by a preceding tracing roll moving along a groove formed in the inside of the steel pipe.

Figure 1:
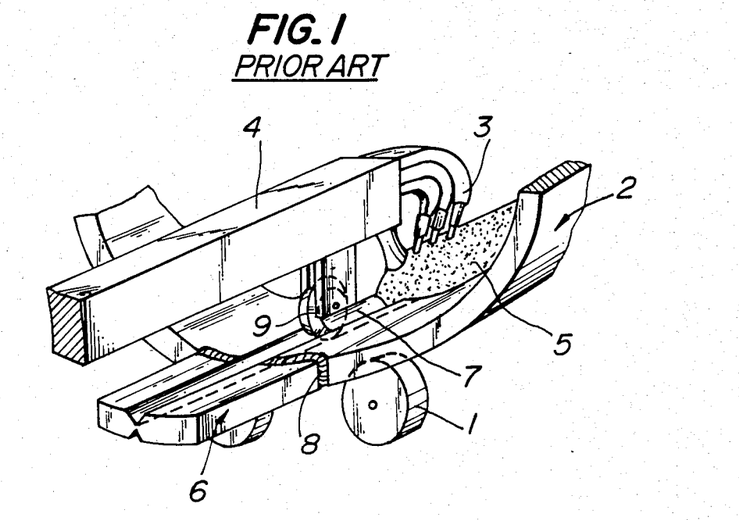
FIG. 1 is a partial perspective view exemplarily illustrating a principal part of a longitudinal welded steel pipe welding method of the prior art using tab plates.

FIG. 1 exemplarily illustrates the carrying out of the inner seam welding of a steel pipe. The steel pipe 2 is so arranged on turning rolls 1 that a seam of the steel pipe 2 assumes the lowermost position. A boom 4 carrying welding electrodes 3 is inserted at one opening of the pipe into the pipe to the other opposite opening. While the boom is withdrawing from the pipe at a constant speed, the required seam welding is carried out. In the case of SAW, a device (not shown) for supplying flux 5 shown in FIG. 1 is arranged on the boom 4, while a device (not shown) for supplying a shield gas is arranged on the boom 4 for the MIGW.

In such seam weldings, there is a tendency for beads at a commencement and a termination of the welding to become defective in configuration and quality. In order to improve the quality and yield rate of the longitudinally welded steel pipes, therefore, tab plates 6 are, in general, previously welded to both ends of the steel pipe at the seam and welding is started from one point on one tab plate and terminated in on the other tab plate.

The tab plate 6 is a steel plate substantially the same in material and thickness as the steel pipe 2 and has a groove substantially the same in cross-section as the groove 7 of the steel pipe 2, thereby improving the quality and configuration of the welded bead at the ends of the steel pipe. In this case, the tab plates 6 are fixed to the steel pipe 2 by weld beads 8 by $CO_2$ gas welding or manual welding.

In welding steel pipes, moreover, it is necessary to provide guide means for exactly moving a heat source for welding along the groove 7 to be welded because of its long weld line. It may be considered to use an optical or electromagnetic guide means which moves in advance of the heat source without touching the steel pipe. In welding the insides of the steel pipes, however, tracing rollers 9 directly in contact with the grooves 7 to trace the weld lines in advance of the heat source are usually used for this purpose in consideration of the limitation of space and security of tracing. The tracing roller 9 is directly secured to the boom 4 in a manner that all load at one end of the boom 4 more than 1 ton is transmitted to the steel pipe 2.

However, the tab plates 6 are inherently not parts of a complete steel pipe and require great material and working cost and extra cost for mounting and dismounting from the steel pipe. In order to obtain higher productivity, therefore, it is very desirable to carry out the welding without using such tab plates. Accordingly, a welding method without using the tab plates has been eagerly expected for many years, which is capable of maintaining high quality and configuration of the weld at the ends of the steel pipe.

In view of this, the inventors of this application have proposed a welding method without the above tab plates 6 and processes in connection therewith to improve the productivity, disclosed for example in Japanese Laid-open Patent Application No. 57-81,990 (Japanese Patent Application No. 156,683/80).

Figure 2:
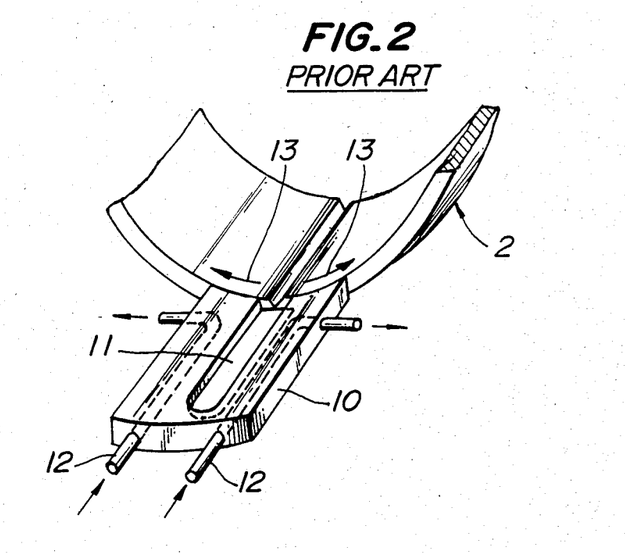
FIG. 2 is a partial perspective view exemplarily illustrating a principal part of the prior art metal plate system longitudinally steel pipe welding method.

FIG. 2 exemplarily illustrates the method of the Japanese Laid-open Patent Application No. 57-81,990 (referred to as "prior art metal plate system", hereinafter). Namely, instead of the tab plates welded to a steel pipe, high thermal conductive metal plates 10 made of for example copper are urged against both ends of the steel pipe at the proximity of seam. Welding starts on one metal plate 10 and terminates on the other metal plate 10. If required, each of the metal plates 10 is formed with a groove 11 to put bead shapes in order. When the welding heat input is high, minimum required set plates are engaged in the grooves 11 of the metal plates before welding. Moreover, it is preferable for the high thermal conductive metal plate 10 to have a sufficient heat capacity in itself or to be positively cooled by water or the like flowing through cooling pipings 12 provided in the metal plate.

The metal plates 10 are required to have a cooling faculty for the following reasons.

If the cooling faculty of the metal plates 10 is insufficient, beads on the plates 10 or set plates themselves are angularly deformed in longitudinal section or deformed raising out of the normal shapes in a manner that the further the distance from the end of the steel pipe, the larger is the raising deformation. Such an angular deformation of the beads or set plates makes it impossible to keep the proper quality and configuration of the beads at the ends of the steel pipe. The sufficient cooling faculty of the metal plates prevents the angular deformation of the beads. This is a first reason.

Thermal stresses due to the welding heat accumulated without sufficiently dissipating in the proximity of the end of the steel pipe occur in directions shown by arrows 13 in FIG. 2, which tend to tear the weld beads. These tearing forces pull the part of the bead which has not sufficiently solidified to cause pipe end cracks so-called "hot cracking". Accordingly, it is necessary to eliminate the thermal stresses causing the tearing forces due to the welding heat or to restrain the tearing portions to suppress the tearing forces. The cooling faculty of the metal plate 10 can mainly eliminate the thermal stresses due to the welding heat. This is a second reason.

Referring back to the tab plate 6 and the weld bead 8 shown in FIG. 1 from the viewpoint aiming to prevent the deformation of the set plates and to eliminate the tearing force, the tab plate 6 should have a sufficient width in a lateral direction or in a direction perpendicular to the weld line and the weld bead 8 should have a sufficient depth of penetration with a sufficient bead length, thereby simultaneously preventing the welding heat from accumulating at the end of the steel pipe. In order to fulfil these requirements, the material, working and mounting costs of the tab plates 6 are greatly increased disadvantageously to unavoidably lower the productivity of welding processes. In view of this, the solution for the above problems has been much eagerly expected.

Under such a circumstances, the "prior art metal plate system" has been expected to remarkably increase the productivity of welding processes. With this metal plate system, although the angular deformation can be prevented, pipe end cracks frequently occur when beads are much susceptible to the hot cracking, so that this system does not sufficiently solve the problem of the pipe end cracks. Accordingly, the inventors investigated main factors for the pipe end cracks in the prior art metal plate system (FIG. 2) to find the following two factors.

(i) The pipe end cracks are caused by not only the bead tearing forces but also lateral angular deformations of the steel pipe or changing of the deformations occurring on both sides of the bead in lateral directions perpendicular to the weld line due to a load of the tracing roller. This is particularly acute in case of the metal plate system without tab plates 6.

(ii) Even if the metal plate 10 itself has an enough cooling faculty, the cooling effect only serves to cool the area of the steel pipe in contact with the metal plate 10, so that the pipe end cracks due to the tearing force cannot be sufficiently prevented because of the susceptibility of the bead to the hot cracking.

The above factors (i) and (ii) will be explained hereinafter in more detail.

Figure 3:
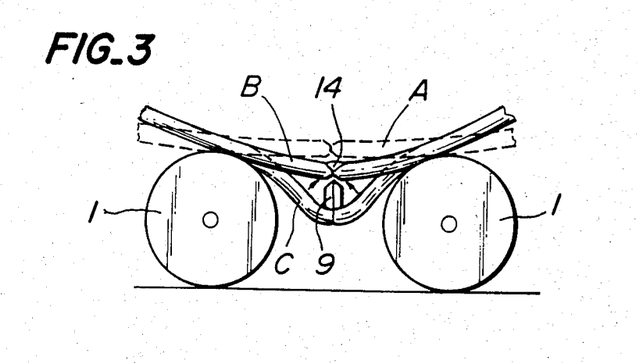
FIG. 3 is an explanatory view of various conditions of lateral angular deformations at a steel pipe end.

First, the lateral angular deformation of the factor (i) due to the load of the (preceding) tracing roller 9 will be explained by referring to FIG. 3. In FIG. 3, a latter A illustrates a part of a steel pipe 2 as arranged on turning rollers 1 and B shows the part which has been laterally angularly deformed by weld bead 14. A letter C illustrates the part which has been further deformed by the load of the boom transmitted to the part through the tracing roller 9. In the condition B, the lateral angular deformation is caused by welding and constricting of the weld bead so as to depress the part of the steel pipe between the turning rollers 1. However, as the steel pipe is restrained by the turning rollers 1, the amount of the lateral angular deformation is relatively small in comparison with the case without the turning rollers and the weld bead is subjected to bending moments correspondingly caused by the restrained lateral angular deformation in directions tearing the weld bead during the processes of welding and contracting of the weld bead. In the condition C, on the other hand, the load of the boom is transmitted through the tracing roller 9 to the steel pipe 2 to deform the part of the steel pipe to an extent substantially equal to that in the case without the turning rollers 1, such that the weld bead 14 is not subjected to bending moments during the processes of welding and contracting of the weld bead. In the prior art using the tab plates 6 welded to the steel pipe, the hot cracking does not occur because the above condition C is maintained even when the tracing roller 9 rides on the tab plate 6.

In the process without using the tab plates as shown in FIG. 2, however, at a moment when the tracing roller 9 rides on the metal plate 10, the condition returns immediately from C to B because of no rigid connection between the metal plate 10 and the steel pipe 2, so that the bead 14 is subjected to a considerably larger bending moment than the case of variation in condition from A to B. As the result, pipe end cracks occur. In this manner, the pipe end cracks are caused by the factor other than the tearing force resulting from the thermal stresses (deformations) due to the welding heat.

Then, the factor (ii) will be explained in detail, which is the case the removal of the heat at the end of the steel pipe for reducing the tearing force is insufficient although the cooling faculty of the metal plate 10 itself is sufficient in the system without using the tab plates as shown in FIG. 2.

Even if the cooling faculty of the metal plate 10 itself is sufficient, the cooling effect serves to cool only the area of the steel pipe in contact with the metal plate and the removal of the heat is insufficient in case of the bead highly susceptible to the cracking. In the metal plate system, therefore, in addition to the removal of heat by the metal plate, the tearing force should be reduced or restrained.

As a result of a detailed investigation on the tearing force and bending moment, moreover, it has been found that in order to prevent the pipe end cracks completely, the bending moments should be reduced in addition to the decrease or restraint of the tearing force.

SUMMARY OF THE INVENTION

It is an object of the invention to provide an improved longitudinally welded steel pipe welding method which eliminates the disadvantages of the prior art and is capable of preventing pipe end cracks with high productivity in welding processes.

It is a further object of the invention to provide an improved steel pipe welding method to prevent pipe end cracks by avoiding bending moments acting upon a weld bead at one end of a steel pipe and by reducing tearing forces acting upon the weld bead by tack welding a seam on an opposite side of an inner groove of the pipe, or heating or cooling both sides of the weld bead.

A longitudinally welded steel pipe welding method for welding an inner seam by welding electrodes held by a boom supported by a preceding tracing roller moving along an inner groove of a steel pipe according to the invention includes steps of urging at least one metal plate against at least one end of the steel pipe at the groove after tack welding the seam on an outside of the steel pipe on an opposite side of said inner groove at least at the end of the steel pipe, and preventing lateral angular deformations or changing of the deformations of the end of the steel pipe on both sides of a weld bead due to a load of the boom when the preceding tracing roller leaves the end of the steel pipe onto the metal plate.

In another aspect, according to the invention, instead of the tack welding, portions on both sides of at least a distal end of a weld bead at the end of a steel pipe are heated to cause expansion displacements of the heated portions directing toward a center of the weld bead so as to reduce tearing forces acting upon the weld bead, thereby preventing pipe end cracks.

In a further aspect, according to the invention, instead of the tack welding, high temperature portions of the end of the steel pipe are cooled after a heat source for seal welding has passed therethrough to reduce tearing forces acting upon a weld bead, thereby preventing pipe end cracks.

The invention will be more fully understood by referring to the following detailed specification and claims taken in connection with the appended drawings.

BRIEF DESCRIPTION OF THE DRAWINGS

FIG. 9 is a partial perspective view of a steel pipe end illustrating a principal part of a tearing force restraining method with tack welding according to the invention;

DETAILED DESCRIPTION OF THE PREFERRED EMBODIMENT

Figure 4:
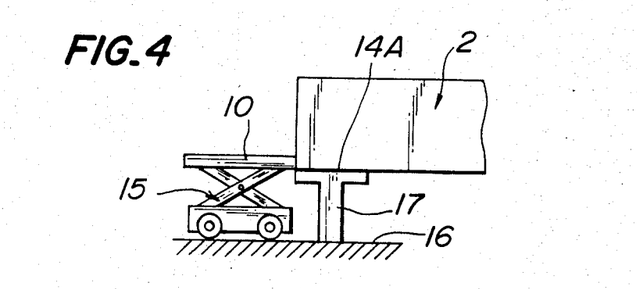
FIG. 4 is one embodiment of the supporting method for a steel pipe end and a metal plate according to the invention.
Figure 5:
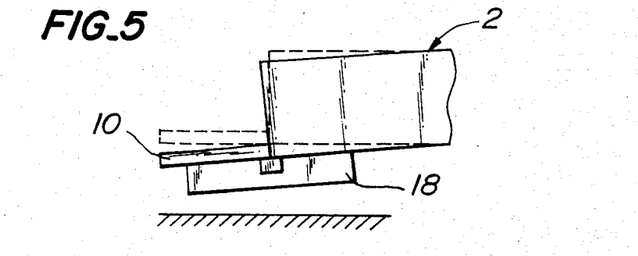
FIG. 5 is another embodiment of the supporting method for a steel pipe end and a metal plate according to the invention.
Figure 6:
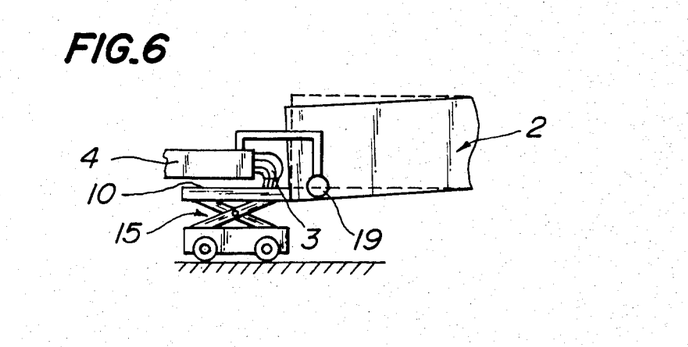

FIGS. 4-6 illustrate embodiments of the method of the invention for preventing the pipe end cracks due to bending moments by urging metal plates 10 to ends of steel pipes at grooves and by preventing the lateral angular deformations or changing of the deformations on both sides of the weld beads at the ends of the steel pipes due to loads of booms when preceding rollers leave the pipe ends onto the metal plates, respectively.

In the embodiment in FIG. 4, an underside of the end of steel pipe at a weld line is supported by a support surface 14A and a metal plate 10 is supported by metal plate support means 15 to prevent the lateral angular deformations or changing thereof on both sides of the weld bead at the end of the steel pipe. That is, in view of the action of the bending moments acting upon the bead 14 in FIG. 3, the end of the steel pipe is supported to prevent it from being brought into the condition C as shown in FIG. 3 in order to keep the lateral angular deformation as if the preceding tracing roller were at the steel pipe end even it rides on the metal plate support means 15. This is because that the bending moment caused during the processes of the welding and contracting of the weld bead in the condition B is so small that the hot cracking does not occur. In this case, the support surface 14A is formed on a support 17 on a base 16 to support the steel pipe 2 at the back of the weld line, so that even if the load of the boom is transmitted to the steel pipe, the condition A or the laterally angularly deformed condition B is maintained.

As a result, when the tracing roller rides on the metal plate 10, the transition form the condition C to B in FIG. 3 is prevented, thereby avoiding the pipe end cracks occurring in this transition process due to the bending moment. In this case, approximately 100 mm of a length of the support surface 14 in the weld line direction is sufficient for this purpose. More than 100 mm of the length is more preferable.

FIG. 5 illustrates another embodiment wherein connecting means 18 restrains the relative movement between the pipe end and the metal plate 10 to prevent the lateral angular deformations on both sides of the weld bead at the pipe end from changing. The connecting means 18 may be for example a powerful magnet or mechanical clamp which is able to connect the steel pipe and the metal plate rigidly against forces. According to this embodiment shown in FIG. 5, even the tracing roller rides on the metal plate 10, the lateral angular deformation is kept as in the condition C shown in FIG. 3 as if the tracing roller were at the pipe end, thereby preventing the pipe end cracks due to the bending moment.

FIG. 6 illustrates a further embodiment wherein the metal plate 10 is supported by the metal support means 15 and a rear tracing roller 19 in addition to the preceding tracing roller 9 is used to transmit all or part of the boom load through the rear tracing roller 19 to the pipe end even after the preceding roller has ridden on the metal plate 10 or has been raised, thereby preventing the lateral angular deformations on both sides of the weld bead at the pipe end from changing.

In other words, because of the additional tracing roller 19 following to the heat source for welding in addition to the tracing roller 9 preceding the heat source, even after the preceding tracing roller 9 has left the pipe end, the rear tracing roller 19 transmits the load of the boom to the steel pipe to keep the lateral angular deformation in the condition C as shown in FIG. 3, thereby preventing the pipe end cracks due to the bending moment.

In this case it is preferable to raise the preceding tracing roller 9 at the moment when the rear tracing roller is brought into contact with the steel pipe, thereby making constant the load of the boom transmitted to the steel pipe 2. When the height of the metal plate 10 is determined before welding, it is preferable to take account of a depression of the steel pipe at its end owing to the load of the beam.

Referring back to the restraint and decrease of the tearing force in order to prevent the pipe end cracks caused by the tearing force resulting from the thermal stresses and deformations due to the welding heat, it is necessary to reduce or restrain the tearing force due to welding heat as the complete dissipation of the welding heat at the pipe end by the metal plate 10 cannot be expected.

Figure 7:
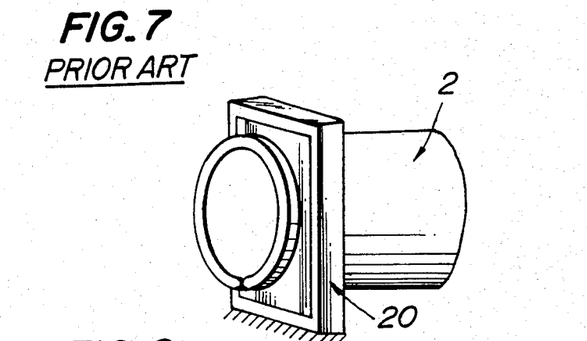
FIG. 7 is a partial perspective view of a steel pipe end illustrating a prior art mechanical tearing force restraining method.
Figure 8:
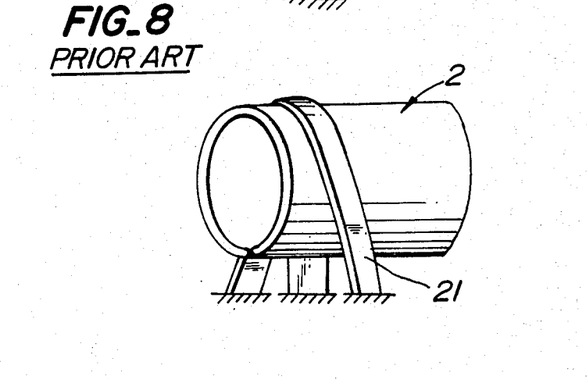
FIG. 8 is a partial perspective view of a steel pipe end showing another prior art mechanical tearing force restraining method.

As shown in FIG. 7, the end of a steel pipe may be inserted into a metal clamper 20 having an inner diameter commensurate to the outer diameter of the steel pipe 2 to restrain the tearing force. Furthermore, the steel pipe 2 may be clamped by steel wires or steel bands 21 as shown in FIG. 8. These methods shown in FIGS. 7 and 8 can substantially completely restrain the deformations of the weld bead to prevent the pipe end cracks, even if the tearing forces caused by the welding thermal stresses act on the weld bead. These methods, however, require time-consuming labor and are not acceptable for the present invention having the object to improve the productivity by deleting the tab plates.

Figure 9:
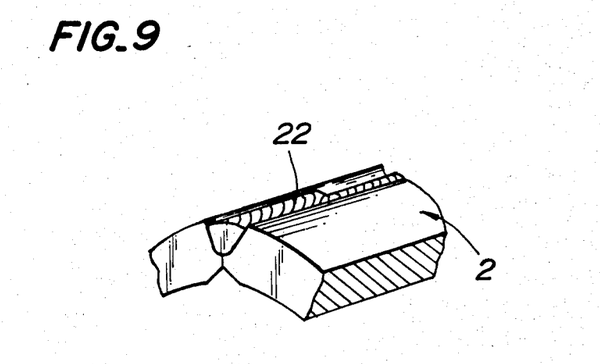
FIG. 9 is a further embodiment of the supporting method for a steel pipe end and a metal plate according to the invention.

Referring to FIG. 9 illustrating a first embodiment of tearing force restraining method according to the invention, before the welding of the groove in the inside of the steel pipe, tack welding is effected on the outside of the pipe on the opposite side of the groove to form a tack bead 22 at least at the end of the steel pipe. As shown in FIG. 9, it is more effective for restraining the tearing force to make thicker the tack bead only at the pipe end in any the case the tack welding is effected along the entire length of the pipe or only at the pipe end. The length of 30 mm or more of the tack bead 22 is sufficient to carry out the invention.

In order to compare the first invention using any one or more of the bending moment preventing methods shown in FIGS. 4–6 and the tearing force restraining method shown in FIG. 9 with the prior art using the metal plates as shown in FIG. 2, comparative tests were carried out. In the tests, steel pipes having diameters of 300–2,000 mm and thicknesses of 5–40 mm were welded with welding heat inputs of 15–130 KJ/cm. When cracks occurred in pipe ends even in part, they were judged as defective cracks.

In the judgement, any cracks did not occur in the pipes welded according to the invention, but cracks occurred in the most of the pipes welded by the prior art using the metal plates. Only one of the bending moment preventing methods shown in FIGS. 4–6 or only the tearing force restraining method shown in FIG. 9 can reduce the cracks in comparison with the prior art welding method using the metal plates, but cannot completely prevent the cracks. In conclusion, according to the first invention simultaneously carrying out both the bending moment preventing and tearing force restraining methods, any cracks in pipe ends did not occur even with any pipes of different sizes under any conditions of welding heat inputs. Accordingly, it has been ascertained that the present invention is very effective to prevent the pipe end cracks with high productivity.

Figure 10:
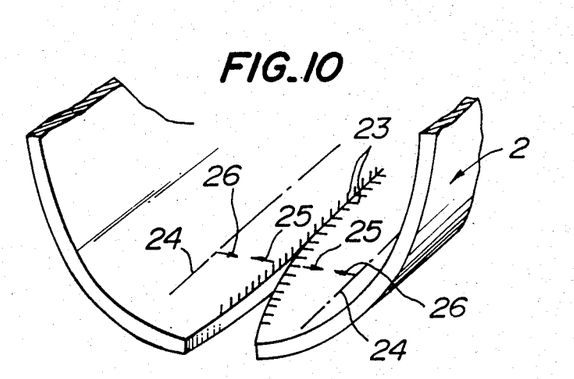
FIG. 10 is a partial perspective view of a steel pipe end illustrating a tearing force reducing method according to the invention.
Figure 11:
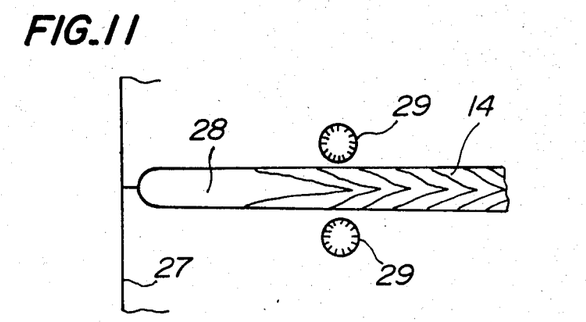
FIG. 11 is a schematic partial plan view of a steel pipe end showing another tearing force reducing method according to the invention.

Referring to FIGS. 10 and 11 illustrating embodiments of the tearing force reducing methods according to the second invention, the proximities on both sides of at least distal ends of the beads are heated in seam welding on insides of the pipes to cause thermal expansion displacements of the heated parts of the pipe toward the center of the weld beads.

The inherent factor for causing the tearing force from the welding thermal stresses is a bimetal action in that when the proximities of the groove indicated by short oblique lines 23 in FIG. 10 are heated by the welding heat, the areas of the lines 23 expand and then contract upon being cooled to open the seam, the opened degree being greater as the nearer to the pipe end. Therefore, portions 24 spaced from and on both sides of the weld bead of the pipe end are linearly heated along the movement of the heat source for welding to obtain expansion deformations in directions of arrows 26 against the deformations in directions of arrows 25 caused by the bimetal action, with the result that the opening of the bead is prevented to avoid the pipe end cracks as shown in FIG. 10.

Referring to FIG. 11, when a bead 14 approaches a pipe end 27, tearing forces act on the rearmost end (finally solidifying position) of a crater 28 to cause the pipe end cracks. In view of this, with the embodiment shown in FIG. 11, the proximities of the rearmost end of the crater are heated to cause expansion displacements toward a center of the bead, thereby reducing the tearing forces to prevent the opening (pipe end cracks). Different from the method shown in FIG. 10, the portions 29 as near as possible to and on both sides of the rearmost end of the crater 28 are heated to cause local expansions about heated portions 29 so as to contract inwardly a zone between the heated portions 29, thereby reducing the tearing forces to prevent the opening (pipe end cracks).

With the method shown in FIG. 11, therefore, it is essential to heat the portions adjacent to and on both sides of the rearmost end of the crater behind the heat source for welding. The nearer to the rearmost end the heated portions, the more effective is the prevention of the pipe end cracks. The heated portions may be moved with the movement of the heat source for welding in the manner as in FIG. 10, so long as it is possible to maintain a relative position between the heat source and the heated portions.

Any single one or combination of the methods shown in FIGS. 10 and 11 may be used for this purpose. The heating by the methods may be applied to the welding side or the inner surface and the opposite side or the outer surface of the steel pipe or to any one of the surfaces. It is of course preferable to apply to both the surfaces of the steel pipe.

In order to compare the second invention using any one or more of the bending moment preventing methods shown in FIGS. 4–6 and any one or both of the tearing force reducing methods shown in FIGS. 10 and 11 with the prior art using the metal plates as shown in FIG. 2, comparative tests were carried out under the same conditions with the same standards as those of the tests as above described. In the tests, any cracks did not occur in the pipes welded according to the invention, while cracks occurred in the most of the pipes welded by the prior art using the metal plates. Only the tearing force reducing method shown in FIGS. 10 and 11 can reduce the pipe end cracks in comparison with the prior art welding method using the metal plates, but cannot completely prevent the cracks.

In conclusion, according to the second invention simultaneously carrying out both the bending moment preventing and tearing force reducing methods, any cracks in pipe ends did not occur even with any pipes of different sizes under any conditions of welding heat inputs. Accordingly, it has been ascertained that the present invention is very effective to prevent the pipe end cracks to ensure the high productivity.

Figure 12:
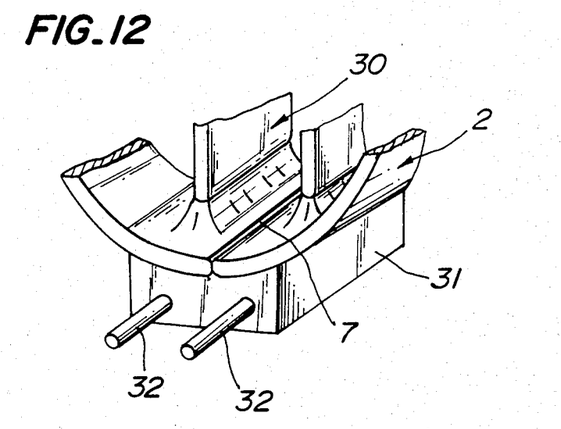
FIG. 12 is a partial perspective view of a steel pipe end illustrating a further tearing force reducing method according to the invention.

FIG. 12 illustrates a further embodiment of the tearing force reducing method according to the invention. In this embodiment, high temperature portions of a pipe end are cooled after a heat source for inner surface seam welding has passed. As the welding heat is unsteady in the pipe end in inner seam welding of a longitudinally welded steel pipe, the temperature at the pipe end is likely to rise to higher temperature than in the inside remote from the pipe end to increase the bimetal action due to the welding thermal stresses. The bimetal action then increases the tearing forces at the pipe end to cause the cracks. Accordingly, it is effective for reducing the tearing force to cool the proximities of the groove in the pipe end. FIG. 2 illustrates the embodied method for this purpose.

Referring to FIG. 12, there is provided a gas-cooling device 30 for jetting a cooling gas against the proximity of a groove 7 in an end of a steel tube 2 to cool the high temperature portion after a heat source for welding has passed. The cooling gas may be air, mist, nitrogen, argon, $CO_2$ and other various kinds of gases.

It is effective to cool an area for example within 300 mm on both sides of the groove 7 and within 200 mm from the pipe end. It is however more effective to cool a broader area than the above area to assure the decrease of the tearing force.

A reference numeral 31 in FIG. 12 denotes a box-shaped cooling device utilizing cooling means other than the gas jetting, which is filled therein with a refrigerant such as dry ice or provided with a piping 32 for circulating cooling water. Even such a cooling device 31 can effectively cool the high temperature portion in the pipe end after the heat source for welding has passed. The above refrigerants such as dry ice or cooling water may be in contact with the steel pipe directly or indirectly through an outer wall of the cooling device 31. In this case, the cooled area can be somewhat narrowed in comparison with the gas jetting of the cooling device 30 but cooling a broader area is preferable as in the cooling device 30.

The above cooling methods using the devices 30 and 31 may be applied to any ones of the inner and outer surfaces of a steel pipe 2. The simultaneous application of the methods on both the surfaces as shown in FIG. 12 ensures the more effective decrease of the tearing force.

In the event that tack welding is effected on an opposite or outer side of a groove prior to regular welding of the groove, the tearing force reducing method shown in FIG. 12 can suppress the temperature rise of tack weld bead to provide an outer restraint of the tearing force which is an additional effect.

For the purpose of comparing the third invention using any one or more of the bending moment preventing methods shown in FIGS. 4-6 and the tearing force reducing method shown in FIG. 12 with the prior art using the metal plates as shown in FIG. 2, comparative tests were carried out under the same conditions with the same standards as those of the tests as above described. In judgement of the test, any cracks did not occur in the pipes welded according to the invention, while cracks occurred in the most of the pipes welded by the prior art using the metal plates. Only the tearing force reducing method shown in FIG. 12 can reduce the pipe end cracks in comparison with the prior art welding method, but cannot completely prevent the cracks.

In conclusion, according to the third invention simultaneously carrying out both the bending moment preventing and tearing force reducing methods, any cracks in pipe ends did not occur even with any pipes of different sizes under any conditions of welding heat inputs. Accordingly, it has been ascertained that the present invention is very effective to prevent the pipe end cracks to ensure the high productivity.

As can be seen from the above description, the longitudinally welded steel pipe welding method according to the invention can effectively prevent pipe end cracks to maintain its high productivity in inner seam welding process.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A longitudinally welded steel pipe welding method for welding an inner seam by welding electrodes held by a boom which is supported by a preceding tracing roller moving along an inner groove of a steel pipe, comprising steps of urging at least one metal plate against at least one end of the steel pipe at said groove after tack welding said seam on an outside of the steel pipe on an opposite side of said inner groove at least at the end of the steel pipe, and preventing lateral angular deformations or changing of the lateral angular deformations of the end of the steel pipe on both sides of a weld bead due to a load of said boom when said preceding tracing roller leaves said end of the steel pipe for said metal plate.

2. A method as set forth in claim 1, wherein the outside of the steel pipe on the opposite side of said inner groove at least at the end of said steel pipe is supported by a support surface and said metal plate is supported by metal plate support means adjustable in height for preventing said lateral angular deformations or changing of said lateral angular deformations of the end of the steel pipe on both the sides of the weld bead.

3. A method as set forth in claim 1 wherein a relative movement between said metal plate and the end of the steel pipe is restrained by connecting means for preventing said lateral angular deformations or changing of the said lateral angular deformations of the end of the steel pipe on both the sides of the weld bead.

4. A method as set forth in claim 1, wherein said metal plate is supported by metal plate support means adjustable in height, and in addition to said preceding tracing roller a rear tracing roller is provided to transmit a load of said boom to the end of the steel pipe after said preceding tracing roller leaves the end of the steel pipe for preventing said lateral angular deformations or changing of said lateral angular deformations of the end of the steel pipe on both the sides of the weld bead.

5. A longitudinally welded steel pipe welding method for welding an inner seam by welding electrodes held by a boom supported by a preceding tracing roller moving along an inner groove of a steel pipe, comprising steps of urging at least one metal plate against at least one end of the steel pipe at said groove, and heating portions of the steel pipe on both sides of at least a distal end of a weld bead at the end of the steel pipe to cause expansion displacements of the heated portions directing toward a center of said weld bead for preventing lateral angular deformations or changing of said lateral angular deformations of the end of the steel pipe on both sides of a weld bead due to a load of said boom when said preceding tracing roller leaves the end of the steel pipe for said metal plate.

6. A method as set forth in claim 5, wherein portions spaced from and on both sides of the weld bead of the end of the steel pipe are linearly heated along a movement of a heat source for welding.

7. A method as set forth in claim 5, wherein portions of the steel pipe as near as possible to and on both sides of a rearmost end of a crater are heated.

8. A method as set forth in claim 5, wherein an outside of the steel pipe on an opposite side of said inner groove at least at the end of the steel pipe is supported by a support surface and said metal plate is supported by metal plate support means adjustable in height for preventing said lateral angular deformations or changing of said lateral angular deformations of the end of the steel pipe on both the sides of the weld bead.

9. A method as set forth in claim 5, wherein a relative movement between said metal plate and the end of the steel pipe is restrained by connecting means for preventing said lateral angular deformations or changing of the deformations of the end of the steel pipe on both the sides of the weld bead.

10. A method as set forth in claim 5, wherein said metal plate is supported by metal plate support means adjustable in height, and in addition to said preceding tracing roller a rear tracing roller is provided to transmit a load of said boom to the end of the steel pipe after said preceding tracing roller leaves the end of the steel pipe for preventing said lateral angular deformations or changing of said lateral angular deformations of the end of the steel pipe on both the sides of the weld bead.

11. A longitudinally welded steel pipe welding method for welding an inner seam by welding electrodes held by a boom supported by a preceding tracing roller moving along an inner groove of a steel pipe, comprising steps of urging at least one metal plate against at least one end of the steel pipe at said groove, and cooling high temperature portions of the end of the steel pipe after a heat source for the seam welding has passed therethrough for preventing lateral angular deformations or changing of said lateral angular deformations of the end of the steel pipe on both sides of a weld bead due to a load of said boom when said preceding tracing roller leaves the end of the steel pipe for said metal plate.

12. A method as set forth in claim 11, wherein said high temperature portions are cooled by a gas-cooling device for jetting a cooling gas selected from air, mist, nitrogen, argon and $CO_2$.

13. A method as set forth in claim 11, wherein said high temperature portions are cooled by a box-shaped cooling device filled with a refrigerant.

14. A method as set forth in claim 11, wherein an outside of the steel pipe on an opposite side of said inner groove at least at the end of the steel pipe is supported by a support surface and said metal plate is supported by metal plate support means adjustable in height for preventing said lateral angular deformations or changing of said lateral angular deformations of the end of the steel pipe on both the sides of the weld bead.

15. A method as set forth in claim 11, wherein a relative movement between said metal plate and the end of the steel pipe is restrained by connecting means for preventing said lateral angular deformations or changing of the deformations of the end of the steel pipe on both the sides of the weld bead.

16. A method as set forth in claim 11, wherein said metal plate is supported by metal plate support means adjustable in height, and in addition to said preceding tracing roller a rear tracing roller is provided to transmit a load of said boom to the end of the steel pipe after said preceding tracing roller leaves said end of the steel pipe for preventing said lateral angular deformations or changing of the deformations of the end of the steel pipe on both the sides of the weld bead.

17. A method as set forth in claim 11, wherein said high temperature portions are cooled by a box-shaped cooling device provided with a piping for circulating cooling liquid.

* * * * *